United States Patent
Head

(10) Patent No.: US 7,504,752 B2
(45) Date of Patent: Mar. 17, 2009

(54) ELECTRIC MOTORS FOR POWERING DOWNHOLE TOOLS

(75) Inventor: Philip Head, Ascot (GB)

(73) Assignee: Artificial Lift Company Limited, Great Yarmouth, Norfolk (GB)

( * ) Notice: Subject to any disclaimer, the term of this patent is extended or adjusted under 35 U.S.C. 154(b) by 0 days.

(21) Appl. No.: 12/008,361

(22) Filed: Jan. 10, 2008

(65) Prior Publication Data

US 2008/0111434 A1  May 15, 2008

Related U.S. Application Data

(63) Continuation of application No. 10/528,664, filed as application No. PCT/GB03/04009 on Sep. 18, 2003, now Pat. No. 7,378,769.

(30) Foreign Application Priority Data

Sep. 18, 2002 (GB) .................................. 0221630.7
Jul. 7, 2003 (GB) .................................. 0315848.2

(51) Int. Cl.
*H02K 5/132* (2006.01)
*E21B 4/04* (2006.01)

(52) U.S. Cl. ................... 310/87; 166/66.4; 417/423.3
(58) Field of Classification Search .................. 310/87; 166/66.4, 66.5; 417/423.3, 423.5
See application file for complete search history.

(56) References Cited

U.S. PATENT DOCUMENTS

| | | | | | |
|---|---|---|---|---|---|
| 1,960,484 | A | * | 5/1934 | Ekstromer | 310/112 |
| 1,978,986 | A | * | 10/1934 | Coberly | 310/87 |
| 2,359,215 | A | * | 9/1944 | Gold | 285/123.12 |
| 3,068,371 | A | * | 12/1962 | Galtz | 310/87 |
| 3,135,884 | A | * | 6/1964 | Luenberger | 310/87 |
| 3,631,275 | A | * | 12/1971 | Conrad et al. | 310/71 |
| 4,492,889 | A | * | 1/1985 | Fukushi et al. | 310/87 |
| 4,687,054 | A | * | 8/1987 | Russell et al. | 166/66.4 |
| 5,142,180 | A | * | 8/1992 | Moore et al. | 310/261 |
| 5,320,182 | A | * | 6/1994 | Mendez | 166/387 |
| 5,734,209 | A | * | 3/1998 | Hallidy | 310/12 |
| 5,923,111 | A | * | 7/1999 | Eno et al. | 310/156.25 |
| 5,959,380 | A | * | 9/1999 | Gillett et al. | 310/54 |
| 6,288,470 | B1 | * | 9/2001 | Breit | 310/254 |
| 6,557,642 | B2 | * | 5/2003 | Head | 166/381 |
| 6,700,252 | B2 | * | 3/2004 | Fleshman et al. | 310/87 |

* cited by examiner

*Primary Examiner*—Burton Mullins
(74) *Attorney, Agent, or Firm*—Andrew Wilford

(57) ABSTRACT

An electric-motor assembly for installation in a borehole to power a downhole tools such as a pump has a first impermeable tube defining an axis and a stator fixed in the tube and having a series of coiled windings and laminations and electrically insulating potting in which the laminations and windings are imbedded. The windings have a connection to an electronically controlled power supply. An annular rotor in the tube radially surrounding the stator includes a permanent magnet coaxial with the windings. The tube seals the stator and rotor from the environment.

8 Claims, 9 Drawing Sheets

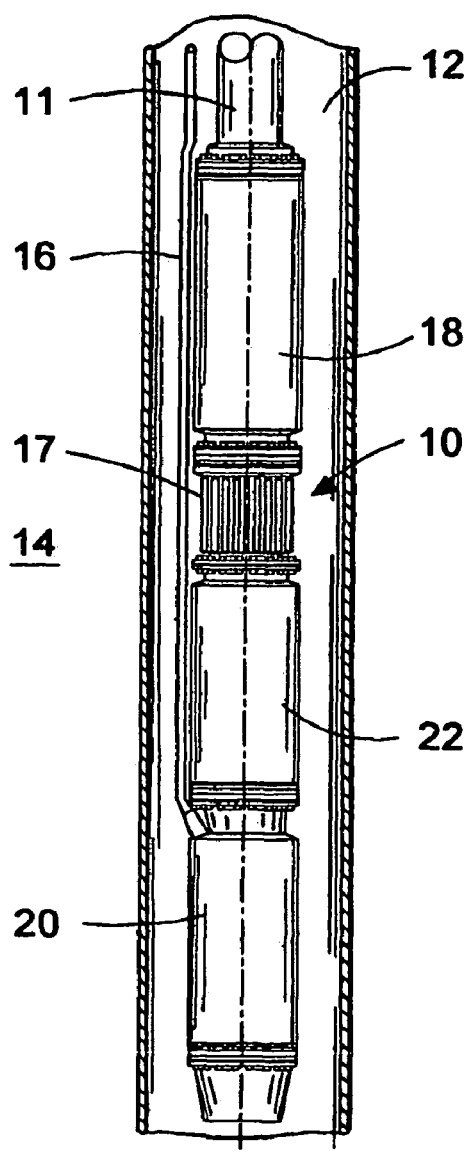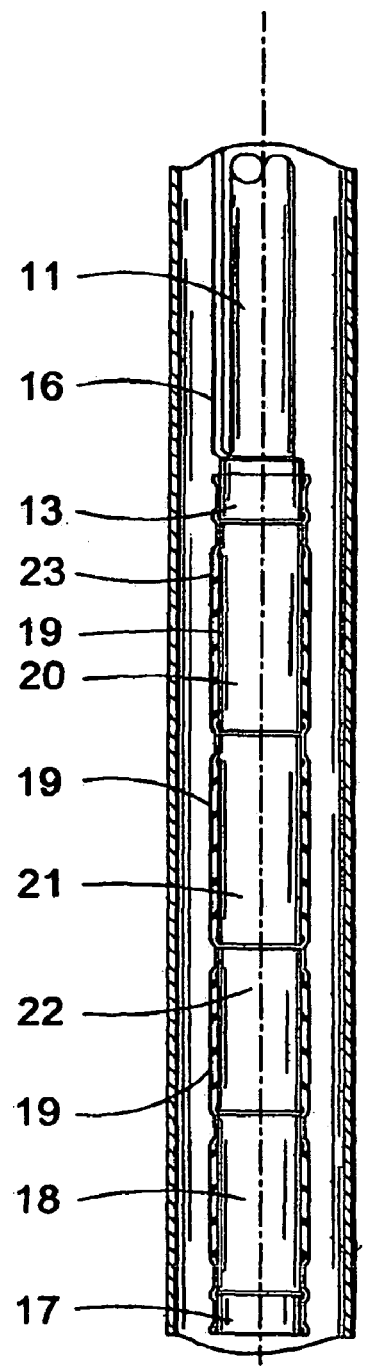
PRIOR ART
Fig. 1
Fig. 1a

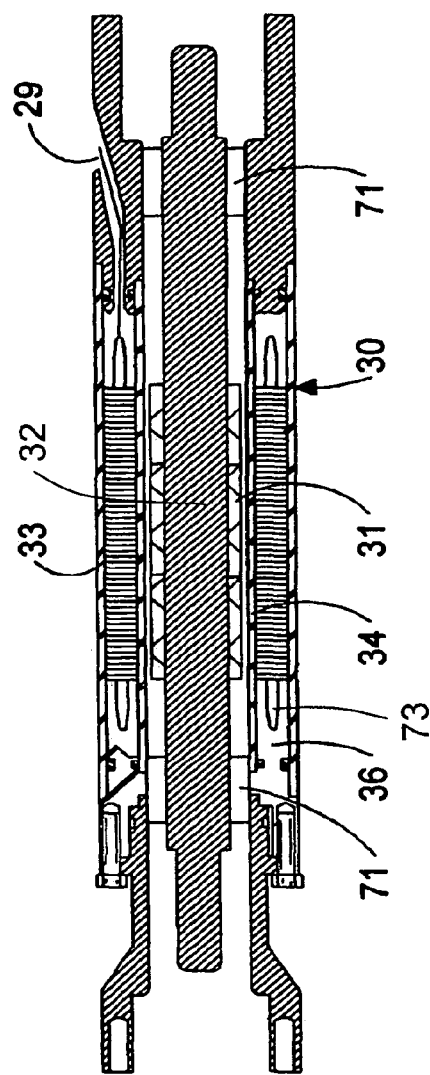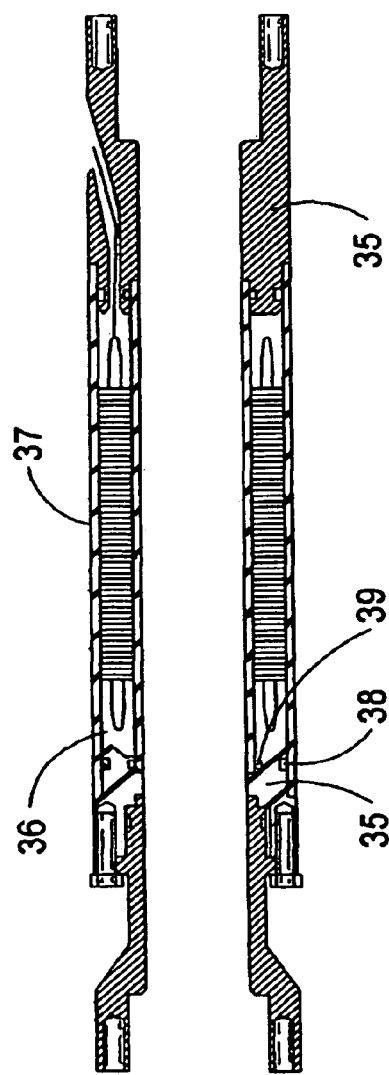
Fig. 3
Fig. 4

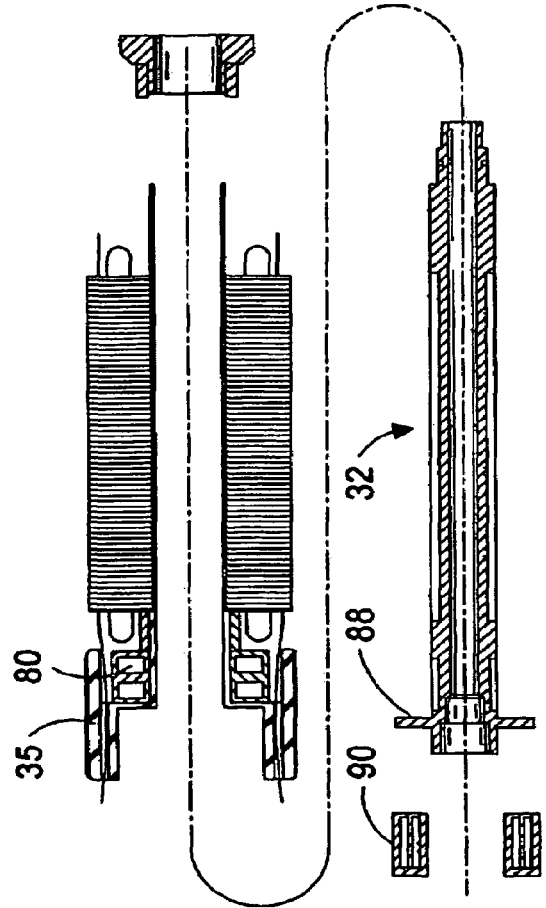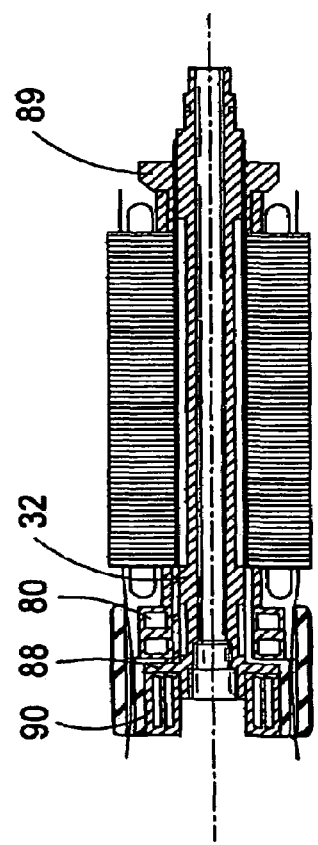

ELECTRIC MOTORS FOR POWERING DOWNHOLE TOOLS

CROSS REFERENCE TO RELATED APPLICATIONS

This application is a continuation of patent application Ser. No. 10/528,664 filed 17 Mar. 2005 now U.S. Pat. No. 7,378,769 the US national phase of PCT application PCT/GB2003/004009 filed 18 Sep. 2003 with a claim to the priority of British patent application 0221630.7 itself filed 18 Sep. 2002 and British patent application 0315848.2 itself filed 7 Jul. 2003.

FIELD OF THE INVENTION

The present invention relates generally to downhole pumping systems and, more particularly to a new electric motor for use with a downhole tools such as a pumping system and that does not require a conventional protector.

BACKGROUND OF THE INVENTION

Electric submersible pumps (ESPs) are widely used throughout the world for bringing subterranean fluids to the earth's surface. For the long-term successful operation of such submersible pumping systems, the electric motor is supplied with uncontaminated motor oil. The motor oil not only lubricates the motor, it also cools the motor to prevent overheating. In most submersible pumping systems in use today, this motor oil is partially contained within a device commonly referred to as a motor protector. Conventional motor protectors typically include one or more elastomeric bags. These elastomeric bags provide two important functions: (1) equalizing the fluid pressure within the motor to that in the adjacent wellbore and (2) preventing well fluids and gases from contaminating the motor oil. In regard to the first function, it should be understood that the temperature of the motor oil varies as a result of the intermittent operation of the submersible motor. As the temperature of the motor oil rises, for instance, the oil tends to expand and the pressure within the motor tends to increase. If the motor protector did not include an expandable member, such as the elastomeric motor protector bag, the internal pressure of the motor would increase dramatically. However, the motor protector bag expands and contracts to compensate for the varying liquid volume and to maintain a relatively constant pressure within the motor. In regard to the second function, the motor protector bag provides a degree of isolation between the motor oil and the well fluids and gases. This isolation helps keep the motor oil clean to increase the longevity of the motor. Most elastomeric motor protector bags prevent many contaminants, such as crude oil, water, brine, and dirt, which may greatly reduce the life of the motor, from entering the motor.

As discussed above, in many applications elastomeric motor protector bags perform reasonably well. However, elastomeric bags suffer from several limitations. First, the repeated expansion and contraction of the elastomeric bag can cause the bag to split or crack under certain conditions. Of course, once an elastomeric bag splits or cracks it no longer protects the motor oil from contaminants that are then free to enter and ultimately damage the motor. Second, elastomeric bags tend to lose their elasticity due to various conditions that may be present in a wellbore. Once an elastomeric bag loses its elasticity, it can no longer expand and contract as needed to satisfy the requirements of the motor oil that it contains. Eventually the bag will rupture, leaving contaminants free to attack the motor. Third, most elastomers cannot survive in environments where the temperature rises above about 400° F. Above that temperature, most elastomers become brittle, causing the bag to break during expansion or contraction. Finally, elastomeric compounds currently used for motor protector bags tend to be relatively permeable as compared to the contaminants within the wellbore fluid. Many wells contain contaminants, such as hydrogen sulphide for instance, which will permeate the motor protector bag and attack the motor. In fact, certain contaminants, such as hydrogen sulphide, also tend to alter the chemistry of certain elastomers, causing the elastomers to harden. Once the elastomer has hardened, the bag eventually breaks. In an effort to combat one or more these problems, the elastomeric material used to fabricate the motor protector bags have been studied and chosen to provide certain advantages. For instance, certain elastomers may slow the rate at which contaminants such as hydrogen sulphide enter the motor, but they cannot stop the permeation completely. Alternatively, certain elastomers may exhibit an ability to withstand temperatures as high as about 400° F., but these elastomers tend to have limited elasticity incompatible with the requirements of the motor.

OBJECT OF THE INVENTION

The object of the invention is therefore to provide a new electric motor arrangement for powering downhole tools that avoids these problems with the use of protector bags for protecting motors from the downhole environment.

SUMMARY OF THE INVENTION

According to the present invention there is provided an electric motor for powering downhole tools comprising:
 a first stator;
 a second stator;
 conductive windings;
 an axially located rotatable shaft including a first magnetic element and a second magnetic element; and
 a sealed annular chamber defined by a first tube and a second tube concentrically inside the first tube, the first and second stators being located in the annular chamber, the first magnetic element being aligned with the first stator and the second magnetic element being aligned with the second stator such that when the windings are energized the stators act on the magnetic elements.

Preferably the conductive windings comprise a first set of coil windings disposed in the first stator and a second set of coil windings disposed in the second stator.

According to another aspect of the present invention, there is provided an electric motor suitable for installing in a borehole for powering downhole tools comprising
 a stator including a first set of coil windings;
 a rotatable shaft including a magnetic element; and
 an annular cavity defined by a first hollow tube and a second tube concentrically inside the first tube, the second tube including a flowpath, the stators being located in the annular cavity, the rotatable shaft and the magnetic element being at least partially tubular.

BRIEF DESCRIPTION OF THE DRAWING

Several embodiments of the invention will now be described with reference to the following drawings in which:
 FIG. 1 is a view of the general arrangement of an existing downhole motor used to power a pump;

FIG. 1a is a view of the general arrangement of an embodiment of the invention;

FIG. 3 is a longitudinal section of a motor according to a first embodiment of the invention;

FIG. 4 is a longitudinal section of the motor of FIG. 3 with the rotor removed;

FIGS. 10a and 10b respectively show an exploded and assembled axially sectional views of another embodiment of the modular motor;

SPECIFIC DESCRIPTION

Figure 2:
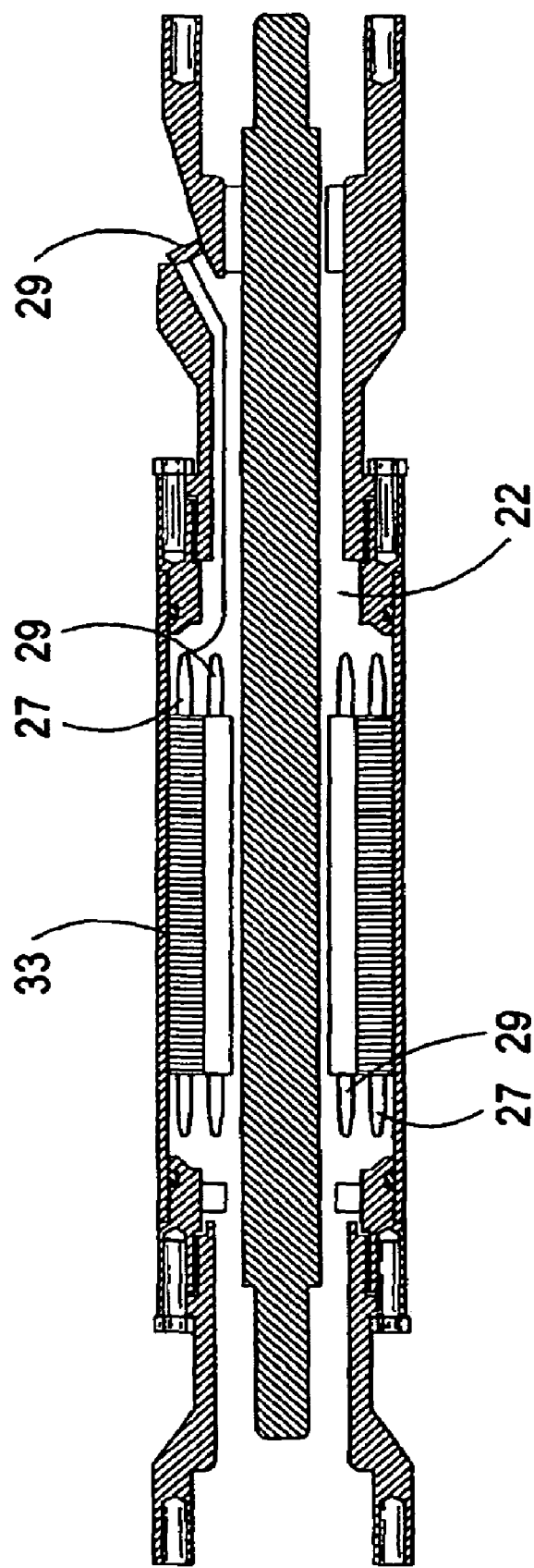
FIG. 2 is a longitudinal section of the typical prior art motor used in FIG. 1.

Where equivalent components appear in different embodiments, the same designating numeral will be used.

Referring initially to FIG. 1, a pumping system is illustrated and generally designated by a reference numeral 10. The pumping system 10 is shown located in a well bore 12 that has been created within a subterranean formation 14. Although not specifically illustrated, it is well known that the well bore 12 contains fluids and gases from the surrounding formation 14 and that the pumping system 10 is adapted to be submerged in these fluids and gases within the well bore 12. The system 10 is typically part of a production tubing string 16 and is responsible for pumping fluids and/or gases from the well bore 12 to the surface of the earth. The pumping system 10 includes a pump inlet 17 and a pump 18 that is driven by an electric motor 20. The motor 20 contains motor oil (not shown) that lubricates and cools the motor 20. A motor protector 22 is coupled to the motor 20. The motor protector 22 contains a portion of the motor oil, and it functions to keep the motor oil free from contaminants and to maintain a relatively constant pressure within the motor 20. The pump 18 then discharges through the tubing 11.

By contrast, referring to FIG. 1a, according to an embodiment of the present invention a motor protector 22 may be included such as shown here between the pump inlet 17 and the motor module 20, but can be dispensed with as will be described in greater detail below. The components are all generally mounted in a single housing 23. Two motor modules 20, 21 connected in series are attached via a top cap 13 to the tubing 11. Beneath the lowermost motor 21 is fitted the motor protector 22. The pump 18 is situated beneath the motor protector 22, the pump inlet being a bottom cap module 17. Several housing sections, each associated with the component it is housing, are secured together to form the complete housing 23.

FIG. 2 shows a longitudinal section through a conventional electric submersible pump (ESP) motor. These are induction motors that are essentially rotary transformers in which power transfers to the secondary coil on the rotor, which results in rotation of a mechanical load. The tolerance between the rotating and nonrotating components needs to be quite close. The magnetic field is set up in the stator's main inductance (the magnetizing inductance), which typically comprises three windings having a laminated soft-iron core 33. Most of the input power couples to the rotor secondary winding and thus the load. The rotor secondary winding also comprises three windings 27. The stator windings are then driven by utility power via a pot head 29 in phases separated by 120 degrees. The result is a magnetic field that rotates around the motor axis at power frequency divided by the number of poles. Because there are windings on both rotating and nonrotating components and due to the close tolerance between the rotor and stator, they have always had a common pressure compensated oil bath 22.

In FIGS. 3 and 4 we can see the first embodiment of the invention, using a brushless DC motor 30 as opposed to the AC induction motors of the prior art. In these motors permanent magnets 31 are fitted to a rotor 32 supported on rotor bearings 71, and as a consequence the clearance between the rotor 32 and the motor laminations 33 can be larger than that of an induction motor. In this embodiment a sleeve 34 (of non-magnetic stainless steel or a non-magnetic composite material tube) is arranged between the rotor 32 and the stator windings 73 and motor laminations 33. This enables static O-ring seals 38, 39 to be arranged between the sleeve 34 and the end fitting 35 isolating the lamination and windings section of the motor from the rotating sections of the motor and pump. As can best be seen from FIG. 4 a sealed annular chamber 36 is created between the outer housing 37 and the inner sleeve 34 in which the motor laminations 33 and connections are located. The sealed chamber 36 is defined at each end by the end fittings 35 and the corresponding O-rings seals 38, 39 provided on the internal wall of the housing 37 and the external wall of the sleeve 34. The seals 38 and 39 do not need to seal against rotational movement but merely to seal against a degree of lateral movement required to compensate for pressure and temperature variations. These seals 38 and 39 are therefore much more reliable and less costly than rotating seals. This sealed chamber 36 is completely isolated from the oil well environment.

This provides the following significant advantages

1. No rotating seals are required to isolate the water and gas-sensitive laminations, electrically insulated windings and electrical contacts.

2. Hydrogen sulphide cannot enter the motor oil past the static seal, so scavengers need not be added to the motor oil. The lack of scavengers is advantageous for various reasons. For instance, motor oil additives, such as scavengers, tend to increase the cost of the motor oil. Also, such additives typically reduce the effectiveness of the motor oil in performing its primary functions of cooling and lubricating the motor. Finally, it has been found that many such scavengers reduce the dielectric constant of the motor oil. In the event that insulation that protects windings and other conductors within the motor fails, a motor oil having a high dielectric constant is advantageous because it will reduce the likelihood of arcing between exposed conductors that may damage the motor.

3. A simple oil expansion and contraction system can be used that is well proven and understood, and again only has non-rotating seals.

Figure 5:
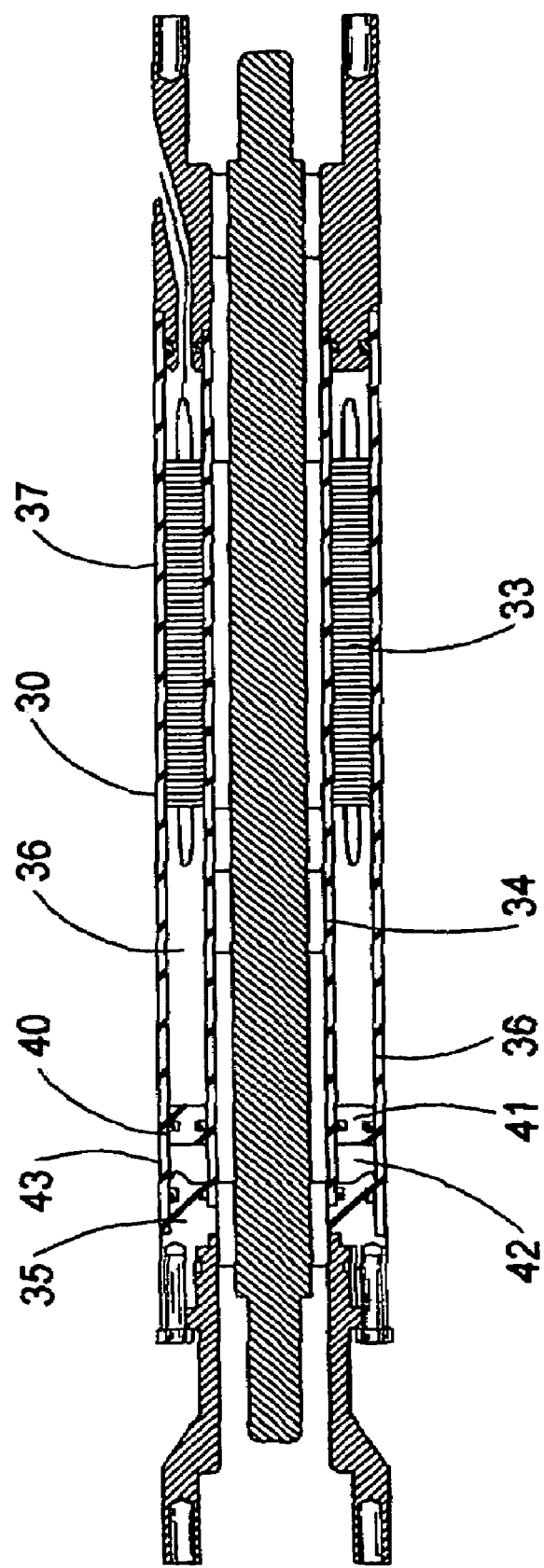
FIG. 5 is a longitudinal section of a motor according to a second embodiment of the invention.

Referring now to FIG. 5 a modification of the embodiment in FIGS. 3 and 4 is shown in which the sealed chamber 36 includes a hydrostatic and temperature/pressure compensation means 40 that allows for the effects of the large pressure and temperature changes that the sealed chamber will be subject to ensuring that no pressure difference builds up that could damage the seals 38, 39, housing 37 or sleeve 34. The compensation means includes a laterally movable plug 41 in sealing engagement with the inside walls of the chamber 36 that forms a compensation chamber 42 having a vent hole 43 through the housing 37 to outside the motor.

Figure 6:
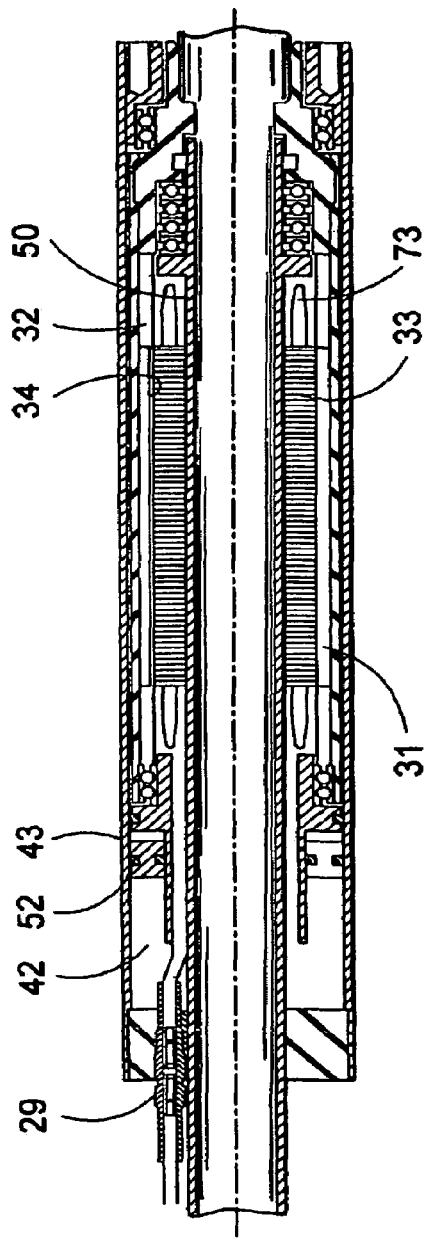
FIG. 6 is a longitudinal section of a motor according to a third embodiment of the invention.
Figure 7:
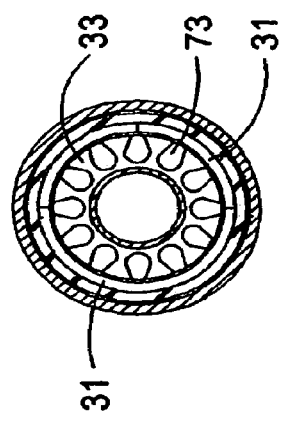
FIG. 7 is a transverse section through the motor of FIG. 6.
Figure 8:
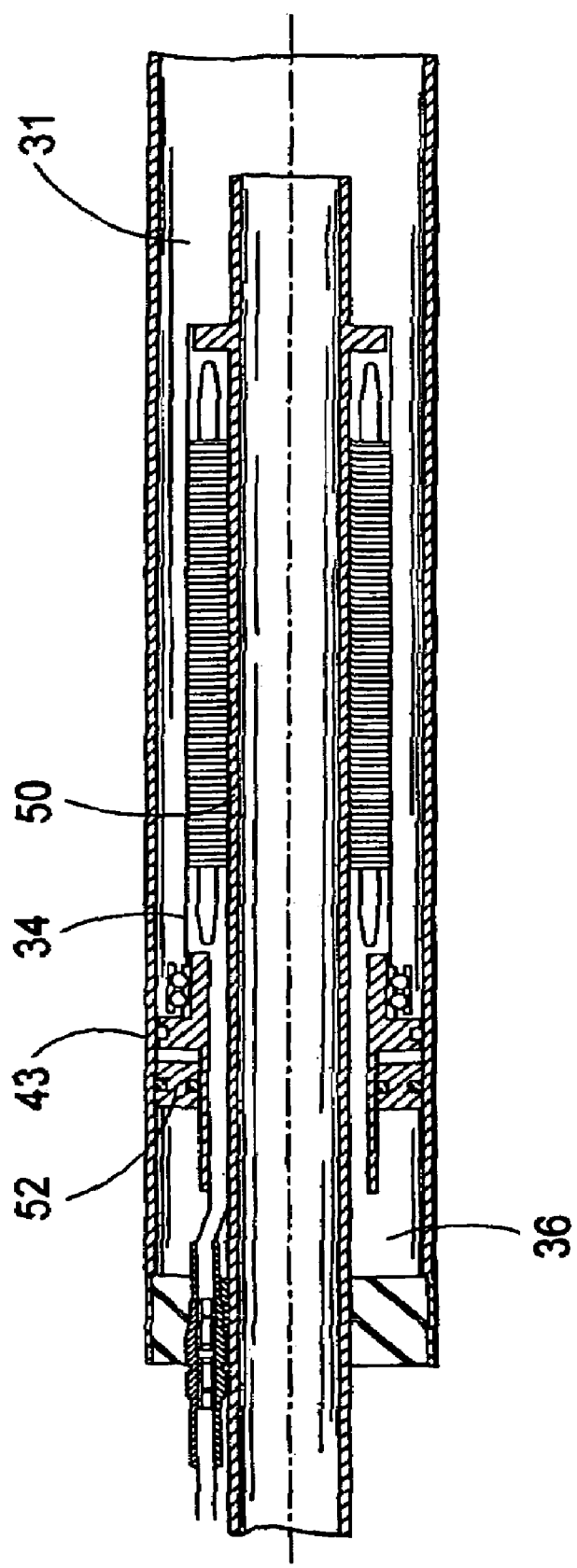
FIG. 8 is a longitudinal section of the motor of FIGS. 6 and 7 with the rotor removed.

Referring now to FIGS. 6 to 8 a further embodiment is shown in which the rotor 32 is arranged outside the laminations 33 allowing flow of fluids through the empty bore of the motor. The same reference numerals in all embodiments are used for corresponding elements even where the arrangement of them is different. The rotor 32 and the permanent magnet 31 are arranged on the outside of the windings 73 and laminations 33, and the windings 73 and laminations 33 are similarly enclosed in a stainless-steel sleeve 34 arranged between the permanent magnet 31 on the one hand and the windings and laminations 33 on the other. The laminations 33 are arranged in annular formation around a tubular internal housing 50 through which pumped fluids flow. A sealed chamber 42 is formed between the internal housing 50 and the sleeve encapsulating the laminations 33 and protecting them from a well fluids. The sealed chamber 42 contains a pressure compensation means 52 that serves to adjust to any pressure changes outside the motor through vent hole 43. This can be seen best from FIG. 8 that shows this embodiment with the rotor removed.

Figure 9A:
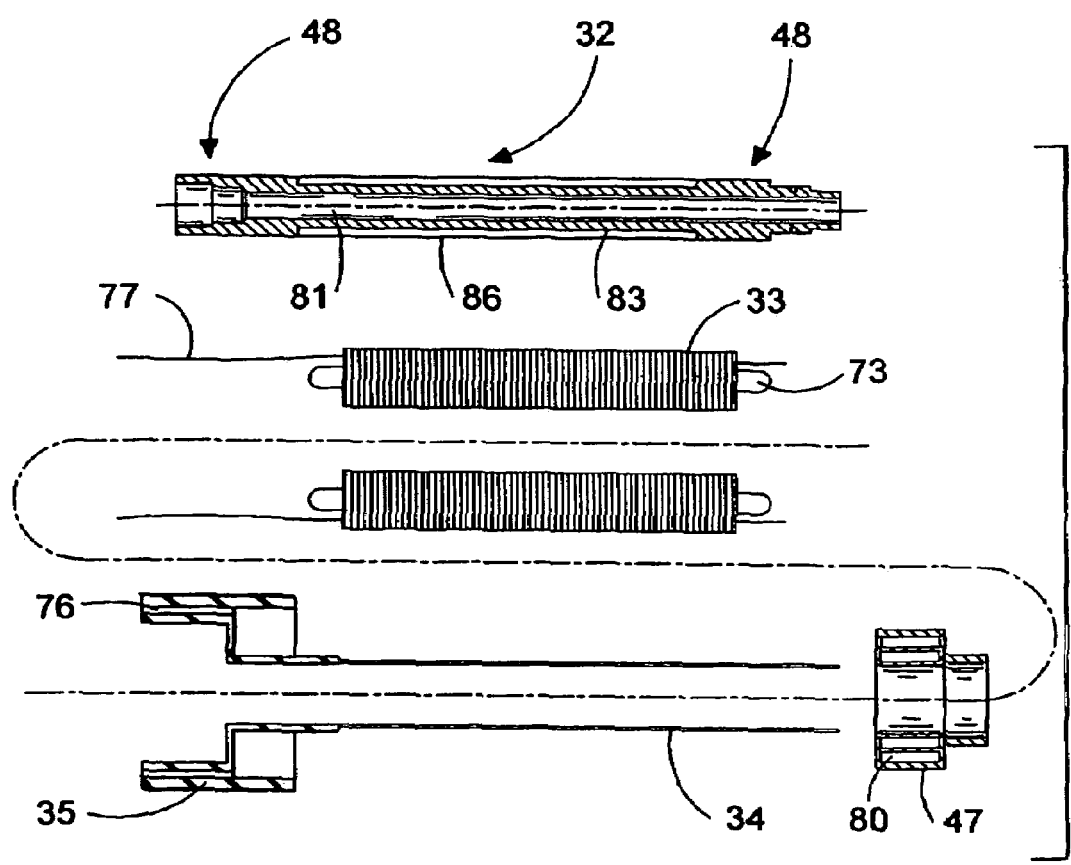
FIG. 9a shows a side view of another embodiment of the modular motor.
Figure 9B:
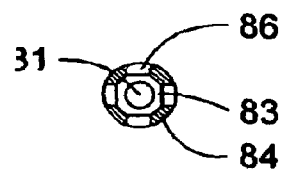
FIG. 9b shows a cross-sectional view of the rotor of this embodiment.

FIGS. 9a and 9b shows details of another embodiment of the modular electrical motor. A sleeve 34 (of nonmagnetic stainless steel or a nonmagnetic composite material tube) is inserted into the bore of the stator's windings and laminations. The sleeve 34 is mounted on an end fitting 35 that has passages 76 for the windings' electric power supply cables 77. A magnetic bearing element 47 including magnets 80 is also fitted over the sleeve 34, against the end fitting 35. The rotor 32 is introduced inside the sleeve 34, so that sleeve 34 separates the stator's laminations 33 and windings 73 from the rotor. The rotor 32 comprises a tube having a flowpath, the tube including a permanent magnets 83 potted in resin 84 upon its surface, protected by a thin non-magnetic sleeve 86. When such motor modules are assembled in series as will be described below, each magnetic bearing element 80 acts on a ferrous portion 48 of adjoining rotors 32, so that each rotor 32 has two such magnetic bearing elements at either end to support it.

Referring to FIGS. 10a and 10b, the end fitting 35 features magnets 80 that form a radial bearing acting to center the rotor 32 while allowing it to rotate. The rotor 32 also includes a magnetically susceptible flange 88. Magnetic thrust bearing elements 90 are fitted to the end fitting 35, and these act on the flange 88 to constrain the rotor against axial displacement. An intermediate member 89 then fits over the non-magnetic sleeve 34 to secure the module's assembly. A further radial bearing may be included at the forward end of the rotor if desired.

The rotor here also includes magnetic elements 29 that are configured to oppose the magnets 80 of the magnetic bearing element 48. Similarly, such opposing magnets may be included at the other end of the rotor, and in the rotor flange to act with the magnetic thrust bearing 90.

Figure 11:
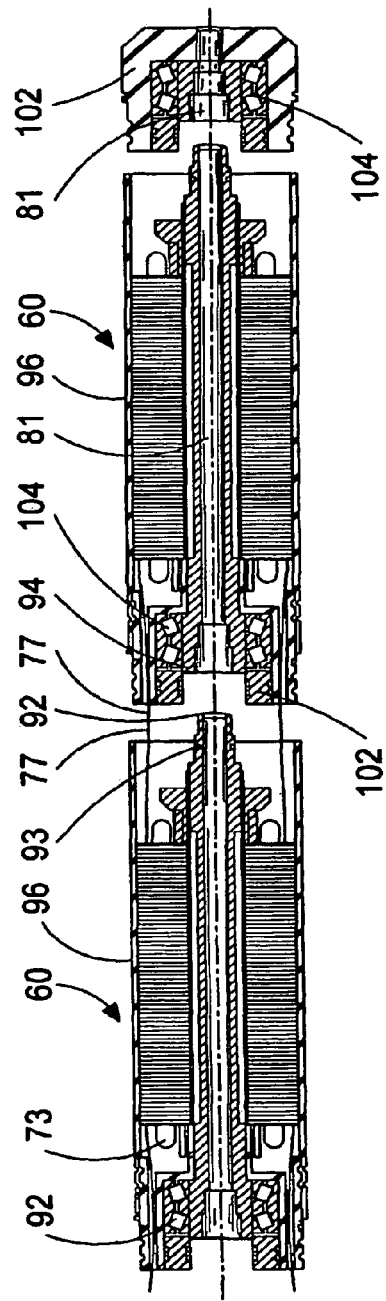
FIG. 11 shows an axially sectional view of the several sections of an embodiment of the modular motor installed in a housing.

Referring to FIG. 11, several motor modules 60 can be arranged in a series (and the windings can be electrically connected in series); two such motor modules are shown here. A modular motor enables a more efficient and productive construction. After each module has been assembled, the adjacent module's electric power supply cables 77 are connected. The module are then pushed together so that the nose of one rotor 92 enters the mouth 94 of the adjacent module's rotor. Ideally, the rotors include interlocking splines so that the shaft as a whole can transmit torque satisfactorily. A seal 93 on each rotor isolates the flowpath 81 from the module components around the rotor. An outer tube 96 has already been secured to the stator's windings 73 and laminations 33 and to part of the end fitting 35. As the modules are pressed together, the part of the end fitting not already secured to the outer tube 96 enters the outer tube 96 of the adjacent module, and is secured, as will be described in more detail below. An end cap 102 having a radial bearing 104 and a bore to continue the flowpath 81 through the rotor is also secured to the last motor module. The module components are then fixed in position by swaging parts of the outside of the outer tube 96, particularly in the region of each end fitting and the end cap. This swaging not only secures the outer tube to the end fitting, but may also be utilized to secure the end fitting to the bearing, the rotor ends to one another, and a seal block 104 to the sleeve 34. This seal block, in addition to the rotor seal 93, helps isolate the common volume containing all the motor modules' windings 73 and laminations 33.

This embodiment shows the rotor 32 supported by conventional roller bearings 104 that constrain the rotor both radial and axially.

Figure 12:
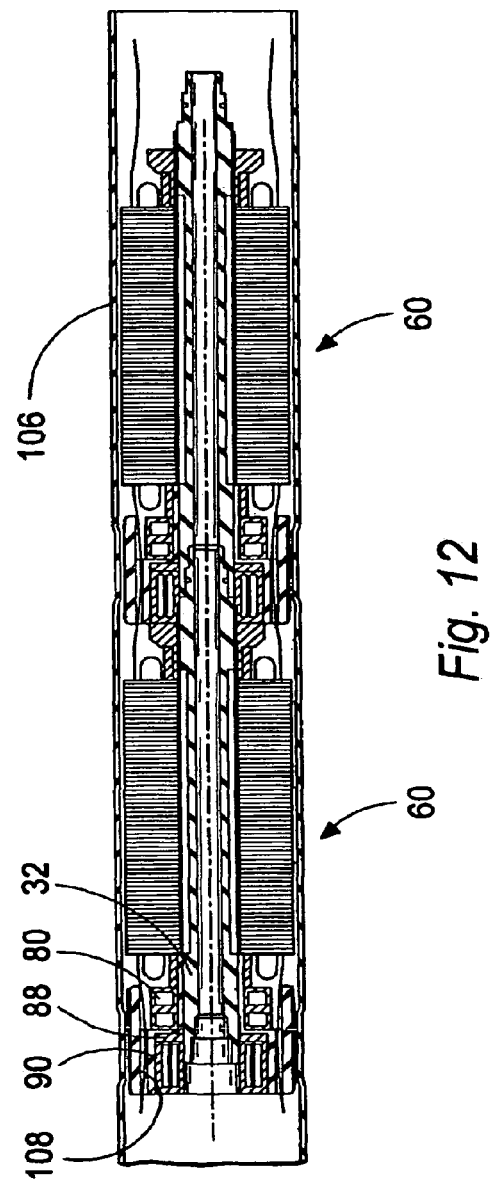
FIG. 12 shows an axially sectional view of the several sections of another embodiment of the modular motor installed in a housing.

Referring to FIG. 12, a series of motor modules 60 may be secured together before being collectively inserted into a single length of outer tube 106. The tube 106 is then swaged in order to secure itself to the motor modules 60. In this embodiment, the bearings shown are magnetic radial and thrust bearings 90, 80. The thrust bearings may incorporate seals 108.

The motor modules 60 could be arranged using a single rotor extending through the modular system. If necessary, parts of the rotor, particularly if being used with conventional bearings, could be secured by introducing a swaging die inside the flowpath of the rotor and increasing the rotor's diameter. Swaging techniques, both of the outer tube and the flowpath of the rotor, may include not only increasing the entire the circumference of part of the tube, but also radial deformation of relatively small regions, such as pressing small dimples into the outer tube to secure it to the motor modules 60 inside.

As in the previous embodiments, this configuration provides the previously discussed significant advantages with regards to the isolating the gas-sensitive laminations, electrically insulated windings and electrical contacts without recourse to rotating seals, the need for scavengers added to the motor oil is obviated since contamination by hydrogen sulphide is eliminated, and simple oil expansion and contraction systems are well proven and understood, and again only has non-rotating seals.

Rather than fabricate each set of coil windings from one cable, and then connected the completed coil windings when the motor modules are placed in series, a single coil winding may be threaded around each set of laminations in successive stators. To this end, a single coil could extend along each stator until the last stator is reached before being folded back and extending along each stator in the opposite direction. Another manner of supplying the stator is to dispose axially oriented cables in the laminations, before connecting the ends of pairs cables so as to form a conductive coiled path.

While the invention may be susceptible to various modification and alternative forms, specific embodiments have been shown by way of example in the drawings and have been be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

I claim:

1. An electric-motor assembly for installation in a borehole to power a downhole tool, the assembly comprising
   a first impermeable tube defining an axis;
   a stator fixed in the tube and having a series of coiled windings and laminations and electrically insulating potting in which the laminations and windings are imbedded, the windings having a connection to an electronically controlled power supply, the stator forming a flowpath that extends through the stator; and
   an annular rotor in the tube radially surrounding the stator and including a permanent magnet coaxial with the windings, the tube sealing the stator and rotor from the environment.

2. The electric-motor assembly defined in claim 1 wherein the potting material is impervious to wellbore fluids.

3. The electric-motor assembly defined in claim 1 wherein the potting material is introduced under a vacuum.

4. The electric-motor assembly comprising a second such assembly as defined in claim 1 with the two assemblies connected in series.

5. The electric-motor assembly defined in claim 4 wherein the electric-motor assemblies are secured together and both imbedded in the potting material.

6. An electric-motor assembly for installation in a borehole to power a downhole tool the assembly comprising:
   a first impermeable tube defining an axis;
   a stator fixed in the tube and having a series of coiled windings and laminations and electrically insulating potting in which the laminations and windings are imbedded, the windings having a connection to an electronically controlled power supply;
   an annular rotor in the tube radially surrounding the stator and including a permanent magnet coaxial with the windings, the tube sealing the stator and rotor from the environment;
   a second tube coaxial with the first tube; and
   annular end members that substantially seal an annular space between the first and second tubes.

7. The electric-motor assembly defined in claim 6 wherein the annular end members are attached to the first and second tubes by swaging.

8. An electric-motor assembly for installation in a borehole to power a downhole tool, the assembly comprising:
   a first impermeable tube defining an axis;
   a stator fixed in the tube and having a series of coiled windings and laminations and electrically insulating potting in which the laminations and windings are imbedded, the windings having a connection to an electronically controlled power supply;
   an annular rotor in the tube radially surrounding the stator and including a permanent magnet coaxial with the windings, the tube sealing the stator and rotor from the environment;
   a metal tube set the potting;
   an O-ring in the metal tube; and
   wiring exiting from the potted material through the O-ring and metal tube.

* * * * *